(12) United States Patent
Kawai (10) Patent No.: US 7,924,962 B2
(45) Date of Patent: Apr. 12, 2011

(54) CLOCK REGENERATION CIRCUIT TECHNICAL FIELD

(75) Inventor: Masahiro Kawai, Tokyo (JP)

(73) Assignee: NEC Corporation, Tokyo (JP)

( * ) Notice: Subject to any disclaimer, the term of this patent is extended or adjusted under 35 U.S.C. 154(b) by 940 days.

(21) Appl. No.: 11/660,782

(22) PCT Filed: Aug. 15, 2005

(86) PCT No.: PCT/JP2005/014914
§ 371 (c)(1),
(2), (4) Date: Feb. 22, 2007

(87) PCT Pub. No.: WO2006/025212
PCT Pub. Date: Mar. 9, 2006

(65) Prior Publication Data
US 2007/0253515 A1    Nov. 1, 2007

(30) Foreign Application Priority Data

Aug. 30, 2004   (JP) .................. 2004-250067

(51) Int. Cl.
*H04L 7/02* (2006.01)

(52) U.S. Cl. ........ 375/359; 375/346; 375/343; 375/230; 375/233; 375/235

(58) Field of Classification Search .................. 375/359, 375/346, 343, 230, 233, 235
See application file for complete search history.

(56) References Cited

U.S. PATENT DOCUMENTS

| | | | | |
|---|---|---|---|---|
| 4,468,786 A | * | 8/1984 | Davis | 375/229 |
| 6,175,591 B1 | * | 1/2001 | Iwamatsu | 375/232 |
| 6,259,751 B1 | * | 7/2001 | Park et al. | 375/346 |

FOREIGN PATENT DOCUMENTS

| | | |
|---|---|---|
| EP | 0 810 760 A1 | 12/1997 |
| GB | 2 145 906 A | 4/1985 |
| JP | 64-74830 | 3/1989 |
| JP | 9-130443 | 5/1997 |
| JP | 10-84396 | 3/1998 |
| JP | 11-74942 | 3/1999 |
| JP | 11-331300 | 11/1999 |
| JP | 2000-270038 | 9/2000 |

OTHER PUBLICATIONS

European Search Report dated Oct. 5, 2007.
Hodgkiss W: "Equaliser-based clock extraction for modems" Electronics Letters, IEE Stevenage, GB, vol. 30, No. 16, Aug. 4, 1994, pp. 1277-1279, XP006000862 ISSN: 0013-5194.
Form PCT/IB/338 dated Mar. 8, 2007.
Form PCT/IB/373 dated Feb. 28, 2007.

* cited by examiner

Primary Examiner — Shuwang Liu
Assistant Examiner — Kabir A Timory
(74) Attorney, Agent, or Firm — McGinn IP Law Group, PLLC (57) ABSTRACT

Clock synchronization resistance is improved against selectivity fading without degrading the stability of clock phase synchronization control. Clock phase detector 7, which forms part of a clock reproduction PLL, is preceded by orthogonal component equalizer 6 for removing only orthogonal component interference wave not affecting the clock regeneration, thereby assuring an opening of an eye pattern and maintaining the gain of clock phase detector 7 without erasing the clock phase information. Accordingly, even when inter-symbol interference is caused in a received signal by selectivity fading or the like, part of the interference component can be erased to keep the opening of the eye pattern wide. Thus, the clock synchronization resistance can be improved against the selectivity fading without degrading the stability of the clock phase synchronization control.

6 Claims, 8 Drawing Sheets

FIG. 5 just in phase (a)

clock phase advancing (b)

clock phase delaying

CLOCK REGENERATION CIRCUIT

TECHNICAL FIELD

The present invention relates to a clock regeneration circuit for a demodulator used in a digital radio communications apparatus which employs an orthogonal modulation scheme, and more particularly, to a clock synchronization circuit for a demodulator conforming to a multi-value quadrature amplitude modulation (QAM) scheme.

BACKGROUND ART

In recent years, digitization has been under progress for demodulators in communications systems which employ an orthogonal amplitude modulation scheme as a modulation scheme. In such a digitized demodulator, a clock is regenerated from information extracted from a received signal, and the received signal is sampled using the clock for conversion into a digital signal, followed by demodulation processing. Therefore, the digitized demodulator conforming to the orthogonal amplitude modulation scheme requires a clock regeneration circuit for regenerating a clock synchronized to a clock on the transmission side.

Such a clock regeneration circuit generally performs clock regeneration which involves extracting sampling phase shift information from sampled digital signals. In a zero-cross detection scheme, which is one example thereof, sampling phase error (shift) information is extracted from a phase at which a baseband signal intersects zero which is the center value of the amplitude thereof, using data sampled by an analog/digital converter. Then, the clock phase synchronization is established by PLL (Phase Locked Loop) which is constituted using the error information.

Figure 1:
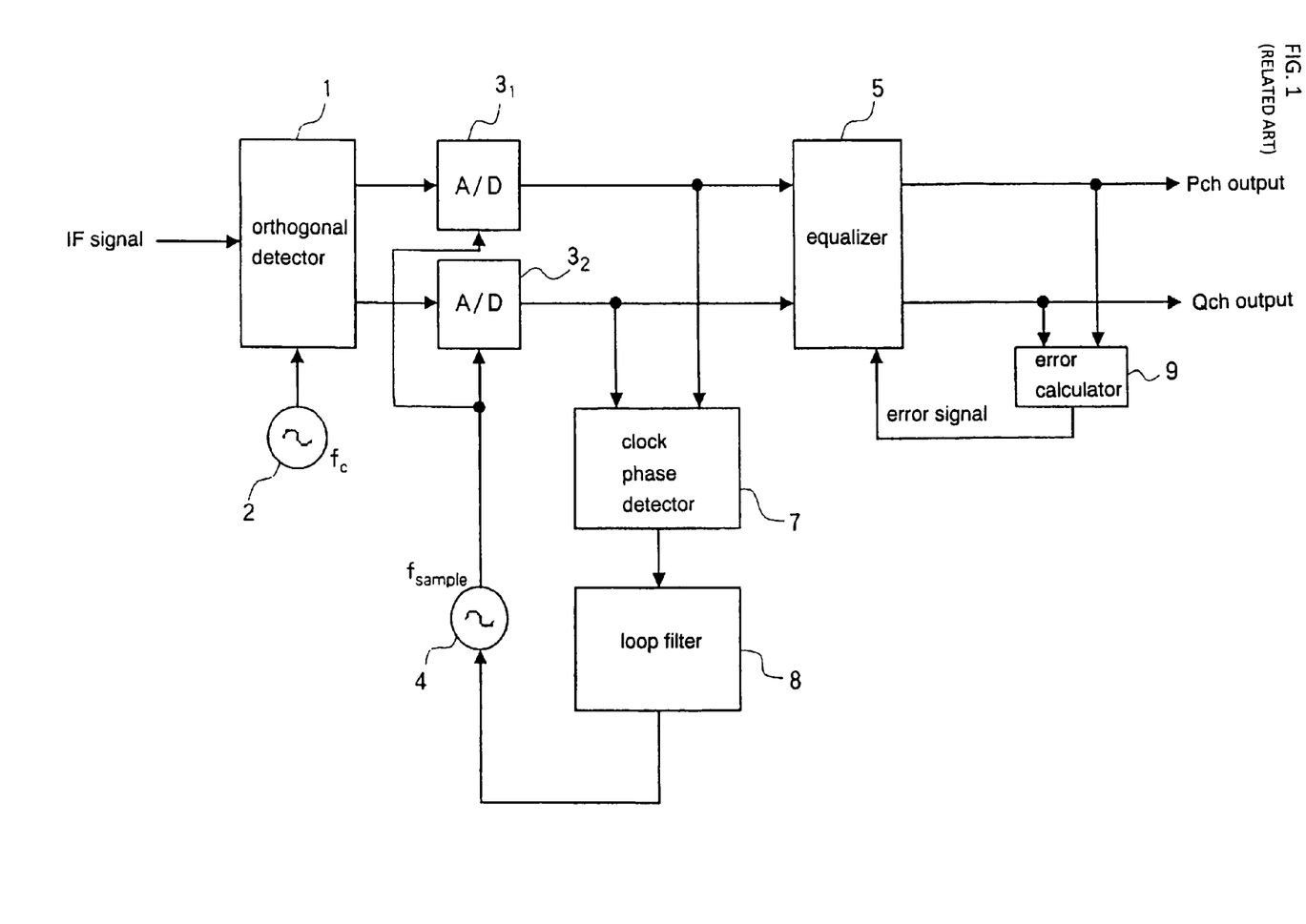
FIG. 1 is a block diagram illustrating the configuration of a conventional demodulator for a digital radio communications apparatus.

FIG. 1 illustrates the configuration of a conventional demodulator for a digital radio communications apparatus which comprises such a clock regeneration circuit. This conventional demodulator comprises orthogonal detector 1, oscillator 2, analog/digital converters (analog/digital converters) $3_1$, $3_2$, voltage controlled oscillator 4, equalizer 5, clock phase detector 7, loop filter 8, and error calculator 9.

Here, a clock regeneration circuit is composed of clock phase detector 7, loop filter 8, analog digital converters $3_1$, $3_2$, and voltage controlled oscillator 4.

Oscillator 2 generates a sinusoidal wave which is equivalent to center frequency fc of an IF (intermediate frequency) signal applied thereto. Orthogonal detector 1 orthogonally detects the applied IF signal using the signal from oscillator 2 to deliver baseband signals of two channels P, Q, as orthogonally demodulated signals.

Analog digital converters $3_1$, $3_2$ sample the two orthogonally demodulated signals delivered from orthogonal detector 1 at a timing determined by a sampling clock signal supplied from voltage controlled oscillator 4 for conversion into digital values which are then delivered.

Clock phase detector 7 detects the phases of the signals applied from a analog digital converters $3_1$, $3_2$ to generate a signal indicative of the direction of a shift at a current sampling position in analog digital converters $3_1$, $3_2$, and the like.

Loop filter 8 removes high frequency components from the signal generated from clock phase detector 7 to supply a frequency control signal to voltage controlled oscillator 4. The configuration of loop filter 8 is based on a low pass filter for restraining high frequency components. Generally, a characteristic low pass filter such as a lag filter, a lag lead filter or the like is used for this loop filter. The characteristics of this filter constitute critical factors for determining the characteristics of PLL, as is well known.

Voltage controlled oscillator 4 generates a sampling clock signal, the frequency of which is controlled by the frequency control signal from loop filter 8, and supplies the sampling clock signal to analog/digital converters 3.

Equalizer 5 compensates the two orthogonally demodulated signals, which have been converted into digital values by analog/digital converters $3_1$, $3_2$, for waveform distortions received through a transmission path or the like.

Error calculator 9 determines how much reception points of the demodulated signals applied thereto through equalizer 5 shift from an ideal signal constellation of the QAM scheme, and delivers the result of the determination as an error signal.

In radio communications, a transmission path falls into multiple transmission paths due to reflected waves from a variety of obstacles. Then, a difference in respective propagation delays results in a problem of frequency selectivity fading (hereinafter simply abbreviated as "selectivity fading") which involves distortions of the frequency characteristics within a transmission band. This leads to inter-symbol interference, where adjacent symbols on the time axis interfere with each other, causing a significant degradation in communication quality. For increasing resistance against such selectivity fading, equalizer 5 is employed in the conventional demodulator illustrated in FIG. 1.

The following two factors are contemplated to determine the resistance of a demodulator against the selectivity fading. One is the capabilities of the equalizer itself, and the other one is the resistance of a clock regeneration PLL against the fading.

In the conventional demodulator, since the clock regeneration PLL has resistance against the selectivity fading higher than the resistance of the equalizer, the capabilities of the equalizer dominate the resistance of the demodulator against the selectivity fading.

In recent years, however, this equalizer 5 has been improved in equalizing capabilities to improve the resistance of the demodulator against the selectivity fading. Nevertheless, due to the improved characteristics of equalizer 5, as stronger fading occurs to result in a deeper notch of the selectivity fading, the clock synchronization becomes instable before equalizer 5 reaches its limitations of equalization capabilities.

A description will be given of a reason for which the selectivity fading causes the clock synchronization to become instable. When the selectivity fading occurs, an eye pattern in a demodulator circuit is affected by distortions to collapse, resulting in the eye pattern having a narrower opening and a wider zero cross range, leading to a reduction in gain of clock phase detector 7 for detecting characteristics of the eye pattern such as the opening, zero-cross point and the like. The characteristics of PLL become instable due to the reduced gain of clock phase detector 7 which forms part of the clock regeneration PLL.

Even if equalizer 5 has been improved in equalization capabilities, the overall demodulator cannot be improved in resistance against the selectivity fading when the clock regeneration PLL is thus instable. Accordingly, a need has been developed for higher resistance of the clock regeneration PLL against the selectivity fading.

For stably regenerating a clock, the opening of an eye pattern must be increased before it is applied to clock phase detector 7. For this purpose, a method of utilizing an equalizer is contemplated in order to eliminate a factor of impeding the opening of the eye pattern, i.e., inter-symbol interference which is caused by the selectivity fading and the like.

JP-A-9-130443, for example, discloses a conventional demodulator which is configured to detect a clock phase from the output of an equalizer to conduct stable clock phase synchronization control. In this conventional configuration, however, even if there is a shift in the phase of a sampling clock, inter-symbol interference resulting from the clock phase shift is equalized, with the result that information on the clock phase shift is erased from the output of the equalizer. Consequently, in a clock regeneration circuit which includes an equalizer, the phase of a regenerated clock is not uniquely determined, resulting in an instable circuit which suffers from jitter introduced into the regenerated clock, and the like. As such, a stable clock regeneration PLL circuit cannot be accomplished by extracting a clock phase component from a signal which has passed through an equalizer.

Stated another way, in the conventional demodulator illustrated in FIG. 1 as well, a new equalizer cannot be provided in front of clock phase detector 7, or the output of equalizer 5 cannot be applied to clock phase detector 7. This is because if such a configuration were employed, the control would become instable due to interactions of an inter-symbol interference compensation operation by the equalizer with a sampling phase control operation, as described above.

DISCLOSURE OF THE INVENTION

The prior art described above has a problem of difficulties in improving both the stability of clock phase synchronization control and the clock synchronization resistance against the selectivity fading due to an instable clock phase synchronization control which would be caused by an equalizer provided in front of the clock phase detector with the intention to improve the resistance against the selectivity fading.

It is an object of the present invention to provide a clock regeneration circuit which is capable of improving clock synchronization resistance against selectivity fading without degrading the stability of clock phase synchronization control.

To achieve the above object, in a clock regeneration circuit for a demodulator used in a digital radio communications apparatus employing an orthogonal modulation scheme, the clock regeneration circuit of the present invention is characterized in that:

orthogonal interfering component reducing means is disposed for reducing only an orthogonal interfering component from interfering components introduced by inter-symbol interference, for a signal applied thereto, in front of a clock phase detector for detecting a direction of a shift of a sampling position in an analog/digital converter.

According to the present invention, the clock phase detector which forms part of a clock regeneration PLL is preceded by the orthogonal component equalizer for removing only an orthogonal component of an interfering wave, which does not affect clock regeneration, to assure the opening of an eye pattern without erasing clock phase information to maintain the gain of the clock phase detector. Therefore, even when intersymbol interference is caused in a received signal by selectivity fading or the like, part of interfering components is eliminated to keep the opening of the eye pattern wider, thereby making it possible to improve the clock synchronization resistance against the selectivity fading without degrading the stability of clock phase synchronization control.

Also, a clock regeneration circuit of the present invention is a clock regeneration circuit for a demodulator used in a digital radio communications apparatus employing an orthogonal modulation scheme, comprising:

two analog/digital converters for sampling orthogonally demodulated signals of a first and a second channels orthogonally detected by an orthogonal detector, respectively, using a sampling clock signal applied thereto for conversion into digital values, and delivering the digital values;

orthogonal interfering component reducing means for reducing only an orthogonal interfering component from interfering components introduced by inter-symbol interference for signals from the two analog/digital converters;

a clock phase detector for detecting the phase of a signal delivered from the orthogonal component reducing means to deliver a signal indicative of a direction of a shift of a sampling position in the two analog/digital converters;

a loop filter for removing high frequency components from the signal delivered from the clock phase detector to deliver as a frequency control signal; and a voltage controlled oscillator for supplying the two analog/digital converters with a clock signal, the frequency of which is controlled by the frequency control signal from the loop filter, as the sampling clock signal.

Further, the orthogonal interfering component reducing means may employ an orthogonal component equalizer which comprises:

a first transversal filter for compensating a signal on a first channel applied from the analog/digital converter for interference caused by an orthogonal component;

a first delay adjustment circuit for giving a delay amount equivalent to a delay amount at a center tap of the first transversal filter to the signal on the first channel applied from the analog/digital converter;

a first adder for adding an output of the first delay adjustment circuit and an output from the first transversal filter to deliver to the clock phase detector as the signal on the first channel;

a second transversal filter for compensating a signal on a second channel applied from the analog/digital converter for interference caused by an orthogonal component;

a second delay adjustment circuit for giving a delay amount equivalent to a delay amount at a center tap of the second transversal filter to the signal on the second channel applied from the analog/digital converter; and a second adder for adding an output from the second delay adjustment circuit and an output from the second transversal filter to deliver to the clock phase detector as the signal on the second channel.

Further, the first and second transversal filters may be applied with and use orthogonal tap coefficients which are used in an equalizer disposed in a demodulator.

According to the present invention, since a tap coefficient controller need not be provided in the orthogonal component equalizer, the orthogonal component equalizer can be restrained in the circuit scale.

BRIEF DESCRIPTION OF THE DRAWINGS

[FIG. 1]
[FIG. 2]
[FIG. 3]

[FIG. 4]

[FIG. 5]

[FIG. 6]

[FIG. 7]

[FIG. 8]

BEST MODE FOR CARRYING OUT THE INVENTION

Next, embodiments of the present invention will be described in detail with reference to the drawings.

First Embodiment

Figure 2:
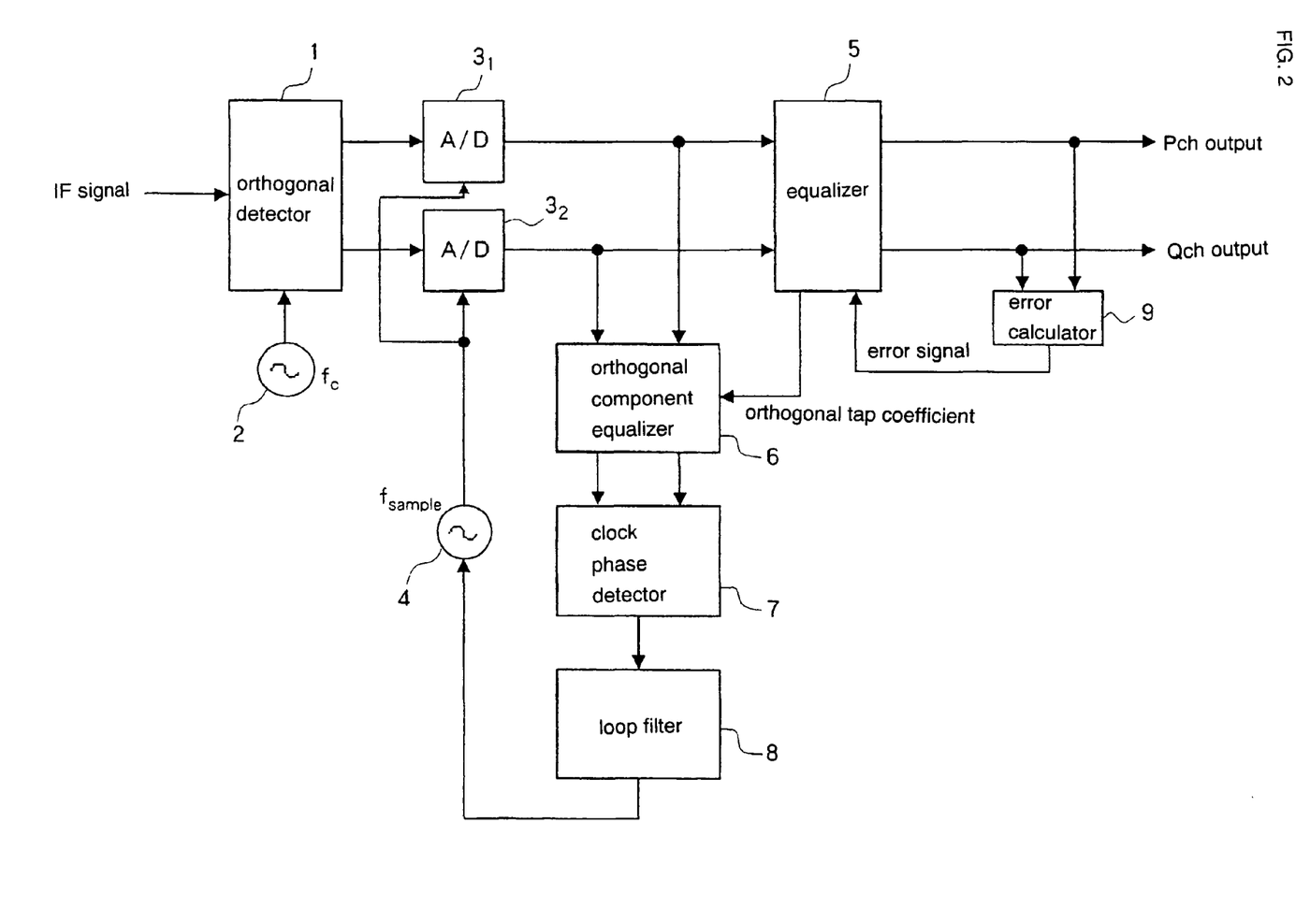
FIG. 2 is a block diagram illustrating the configuration of a clock regeneration circuit according to a first embodiment of the present invention.

FIG. 2 is a block diagram illustrating the configuration of a demodulator which incudes a clock regeneration circuit according to a first embodiment of the present invention. In FIG. 2, the same components as those components in FIG. 1 are designated the same reference numerals, and a description thereon is omitted. In the demodulator of this embodiment, the present invention is applied to a demodulator conforming to the QAM (Quadrature Amplitude Modulation) scheme.

As illustrated in FIG. 2, the demodulator of this embodiment comprises orthogonal detector 1, oscillator 2, analog/digital converters (A/D) 31, 32, voltage controlled oscillator 4, equalizer 5, orthogonal component equalizer 6, clock phase detector 7, loop filter 8, and error calculator 9. The demodulator of this embodiment comprises orthogonal component equalizer 6 provided in front of clock phase detector 7 in addition to the conventional demodulator illustrated in FIG. 1.

In this embodiment, a clock regeneration circuit is composed of clock phase detector 7, loop filter 8, analog digital converters 31, 32, voltage controlled oscillator 4, and additional orthogonal component equalizer 6.

Inter-symbol interference observed in a received signal, which is caused by influences of selectivity fading or the like, causes the opening of an eye pattern to be smaller in an identifier of a demodulator, so that the opening of the eye pattern can be increased if the influence of the interference can be reduced through compensation.

As described above, since the influence of the selectivity fading has been equalized and erased in the output of the equalizer, the eye patterns opens wide. However, because of equalization and erasure of inter-symbol interference resulting from a shift of the sampling clock phase, the clock phase cannot be detected using the output of the equalizer.

Therefore, orthogonal component equalizer 6 is disposed in front of clock phase detector 7 as orthogonal interference component reducing means for reducing only orthogonal components of interfering waves, which do not affect the regeneration of a clock, from a signal applied to the demodulator. In this way, even if the inter-symbol interference is caused in a received signal by selectivity fading or the like, part of interfering components is removed to keep the opening of the eye pattern wide, thereby making it possible to keep the gain of clock phase detector 7 high to make a regenerated clock more stable.

Figure 3:
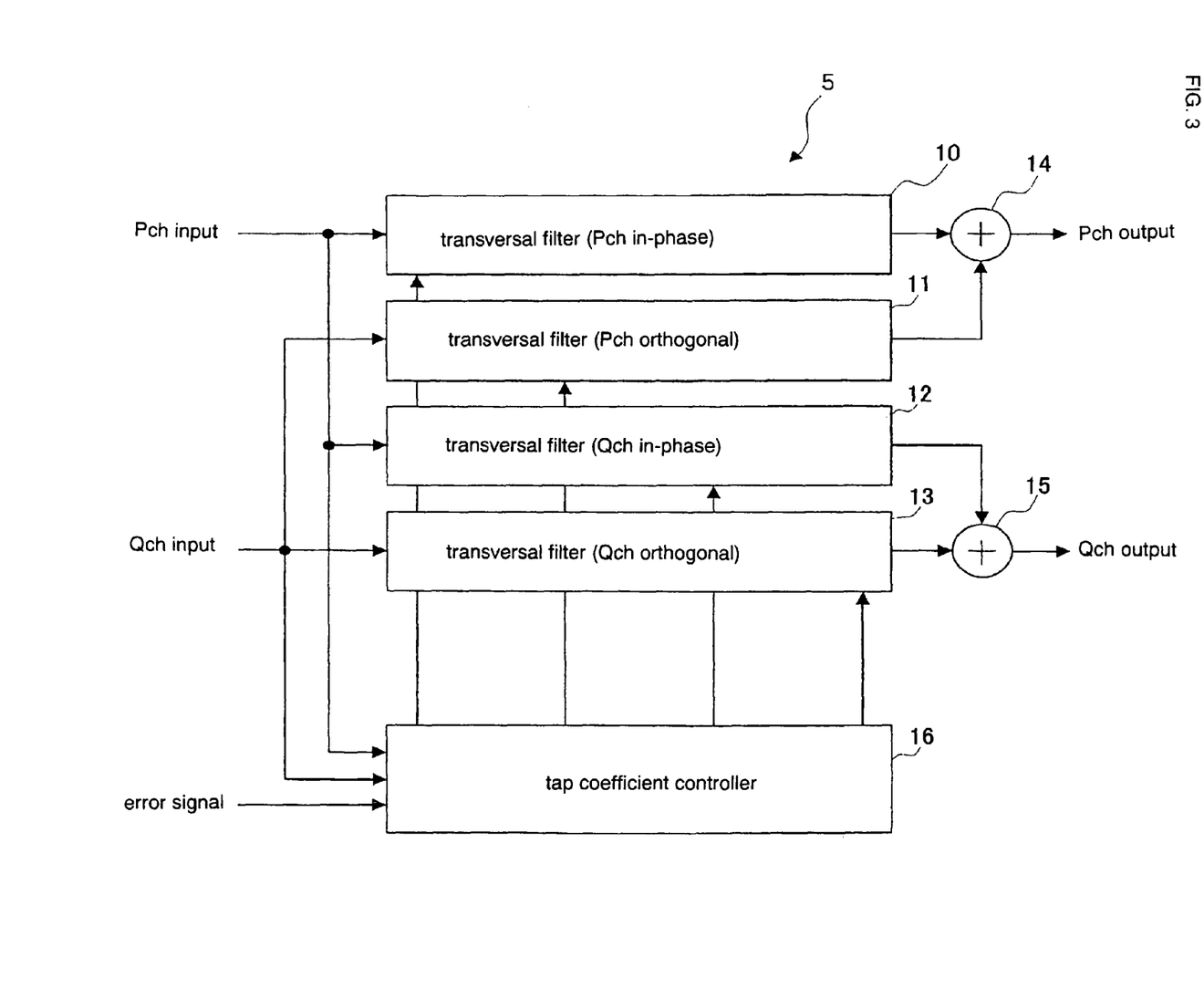
FIG. 3 is a block diagram illustrating the configuration of equalizer 5 in FIG. 2.

Next, FIG. 3 illustrates an example of the internal configuration of equalizer 5 in FIG. 2. Illustrated in FIG. 3 is a linear equalizer which employs transversal filters.

This equalizer 5 is composed of transversal filters 10-13, adders 14, 15, and tap coefficient controller 16, as illustrated in FIG. 3.

Since the equalizer is designed in a baseband region, the equalizer comprises transversal filters 10, 13 for compensating two orthogonal baseband signals for interference due to in-phase components, respectively, and transversal filters 11, 12 for compensating the two orthogonal baseband signals for interference due to orthogonal components. The output of transversal filter 10 for compensating for interference due to an in-phase component of a P-channel, and the output of transversal filter 11 for compensating for interference due to an orthogonal component of the P-channel are applied to adder 14, such that the output of adder 14 is a P-channel output of equalizer 5. Likewise, the outputs of transversal filter 13 for compensating for in-phase interference component of a Q-channel, and transversal filter 12 for compensating for an orthogonal interference component of the Q-channel are applied to adder 15, such that the output of adder 15 is a Q-channel output of the equalizer.

Tap coefficients for respective transversal filter 10-13 are generated by tap coefficient controller 16. Tap coefficient controller 16 establishes a correlation of an error signal applied from error calculator 9 with a signal extracted from before or after equalizer 5, to generate tap coefficients.

Error calculator 9 is applied with a demodulated output after it has been compensated for waveform distortions by equalizer 5. The error signal generated from error calculator 9 is applied to equalizer 5. Error calculator 9 determines at which position a demodulated reception point belongs to in the signal constellation of the QAM scheme, and simultaneously delivers an error of a demodulated signal from a point in the signal constellation of the QAM scheme. This error signal includes information on an interference source such as inter-symbol interference and the like.

Figure 4:
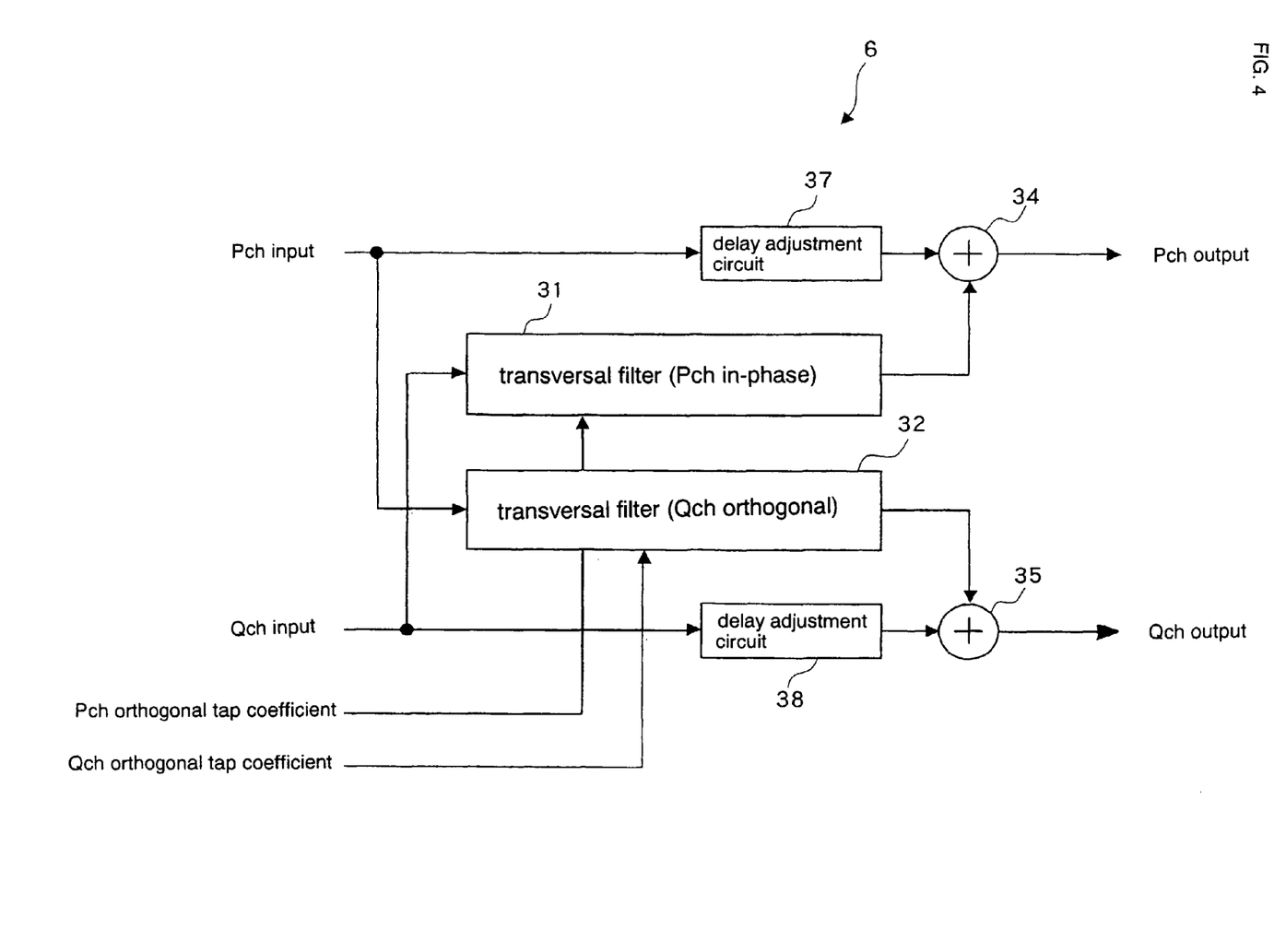
FIG. 4 is a block diagram illustrating the configuration of orthogonal component equalizer 6 in FIG. 2.

Orthogonal component equalizer 6 is applied with the outputs of digital/analog converters 3, removes orthogonal components in interfering components, and delivers the resulting signals. As illustrated in FIG. 4, orthogonal component equalizer 6 comprises orthogonal transversal filters 31, 32, adders 34, 35, and delay adjustment circuits 37, 38. Transversal filters 31, 32 and adders 34, 35 in FIG. 4 correspond to transversal filters 11, 12 and adders 14,15 shown in FIG. 3, respectively.

Transversal filter 31 compensates a P-channel signal applied from analog/digital converter $3_1$ for interference due to a Q-channel signal which is an orthogonal component.

Delay adjustment circuit 37 gives a delay amount equivalent to a delay amount at a center tap of transversal filter 31 to the P-channel signal applied from analog/digital converter $3_1$.

Adder 34 adds the output from delay adjustment circuit 37 and the output from transversal filter 31 to generate the P-channel signal to clock phase detector 7.

Transversal filter 32 compensates a Q-channel signal applied from analog/digital converter $3_2$ for interference due to the P-channel signal which is an orthogonal component.

Delay adjustment circuit 38 gives a delay amount equivalent to a delay amount at a center tap of transversal filter 32 to the Q-channel signal applied from analog/digital converter $3_2$.

Adder 35 adds the output from delay adjustment circuit 38, and the output from transversal filter 32 to generate the Q-channel signal to clock phase detector 7.

Orthogonal component equalizer 6 differs from equalizer 5 in that the former is composed only of orthogonal interfering component compensation filters 31, 32 for removing interference received from orthogonal signals, respectively, for two orthogonally demodulated signals. The number of taps is the same as equalizer 5 or part thereof (a center tap and those centered thereon). The tap coefficients are used by applying all or part of tap coefficients for orthogonal components of equalizer 5. Since orthogonal component equalizer 6 does not equalize in-phase interfering components, in-phase interfering component compensation transversal filters 10,13 are replaced with delay adjustment circuits 37, 38 which have a delay amount equivalent to a delay amount of the center tap.

Next, by way of example, a description will be given of the principle of clock phase detector 7 for detecting a clock phase from two samples of an opening of an eye pattern and one sample of intermediate data therebetween.

Figure 5:
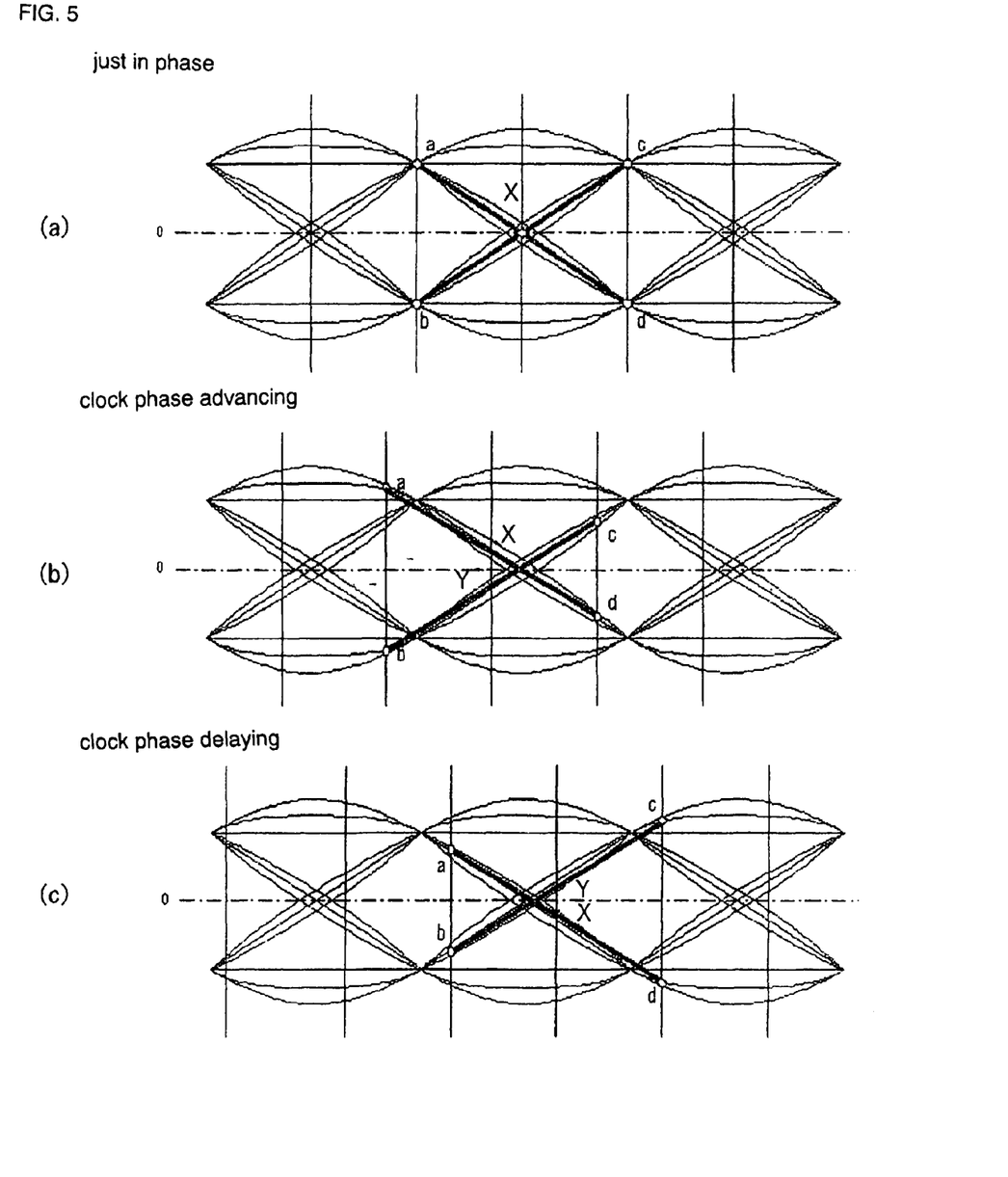
FIG. 5 is a diagram for describing a detection method description of clock phase detector 7.

First, FIG. 5(a) shows a case where sampling is performed at a position at which the clock is just in phase, i.e., at which the eye pattern is most opened. In this event, when two sample values differ in polarity (sampling points a, d or sampling points b, c in FIG. 5(a)), a zero axis is crossed near the middle therebetween. While the zero cross point varies depending on preceding and subsequent signals, the value is zero, on average, at sampling data (X) in the middle of two eye positions.

Next, FIGS. 5(b) and 5(c) show out-of-phase cases. When the clock phase is advancing, intermediate point X between sampling point a and sampling point d has the same polarity as that of sampling point a, while intermediate point Y between sampling point b and sampling point c has the same polarity as that of sampling point b, as shown in FIG. 5(b). When the clock phase is delaying, intermediate point $\mathcal{X}$ between sampling point b and sampling point c has a polarity opposite to that of sampling point a, while intermediate point Y between sampling point b and sampling point c has a polarity opposite to that of sampling point b, as shown in FIG. 5(c). In this way, a determination can be made as to whether the clock phase is advancing or delaying by comparing the polarity at sampling point a with the polarity at intermediate point X, and the polarity at sampling point b with the polarity at intermediate point Y.

Next, the operation of the clock regeneration circuit of this embodiment will be described in detail with reference to the drawings.

A fed IF signal is applied to orthogonal detector 1, and orthogonally detected using a signal from oscillator 2 for generating a sinusoidal wave equivalent to center frequency fc of the IF signal. Orthogonal detector 1 delivers two orthogonally demodulated signals (P-channel signal, Q-channel signal) which are baseband signals.

The two orthogonally demodulated signals delivered from orthogonal detector 1 are sampled by analog/digital converters $3_1$, $3_2$, respectively, for conversion into digital values. A sampling timing in this event is determined by a clock signal supplied from voltage controlled oscillator 4.

The two orthogonally demodulated signals converted into digital values are applied to equalizer 5. Equalizer 5 has a function of compensating for waveform distortions received in a transmission path and the like.

When inter-symbol interference is caused in a transmission path by influences of selectivity fading or the like, error controller 9 generates an error resulting from interfering components. In tap coefficient controller 16 within equalizer 5, a correlation is established between the error signal and signal applied to the equalizer in a correlator for taking the correlation with a signal having a duration corresponding to the source of the interfering component, resulting in the growth of tap coefficients. The growth of tap coefficients results in compensation for and reduction in the interfering components, leading to a reduction in the error generated from error calculator 9. Eventually, the equalization is completed to reach a steady state.

Tap coefficients for orthogonal interfering component compensation transversal filters 11, 12 are extracted from the tap coefficients for equalizer 5, and applied to orthogonal component equalizer 6. Orthogonal component equalizer 6 comprises a circuit for compensating for orthogonal interfering components alone, among the components of equalizer 5, to remove a portion of interference caused by the orthogonal interfering components from waveform distortions which have been introduced by the influence of selectivity fading.

The signals, from which the orthogonal interfering components have been removed, are applied to clock phase detector 7 which generates clock phase retard/advance information. High frequency components are removed by loop filter 8, and the result is applied to a frequency control signal input of voltage controlled oscillator 4. The output of voltage controlled oscillator 4 is applied to sampling triggers of analog/digital converters 3.

An analog input signal is automatically controlled by a PLL (Phase Locked Loop) loop composed of analog/digital converters 3, orthogonal component equalizer 6, clock phase detector 7, loop filter 8, and voltage controlled oscillator 4, such that the analog input signal is sampled in analog/digital converters 3 at a position at which the eye pattern has the largest opening.

Next, a detailed description will be given of a reason for which the clock synchronization resistance can be improved by reducing the orthogonal interfering components before clock phase detector 6.

Figure 6:
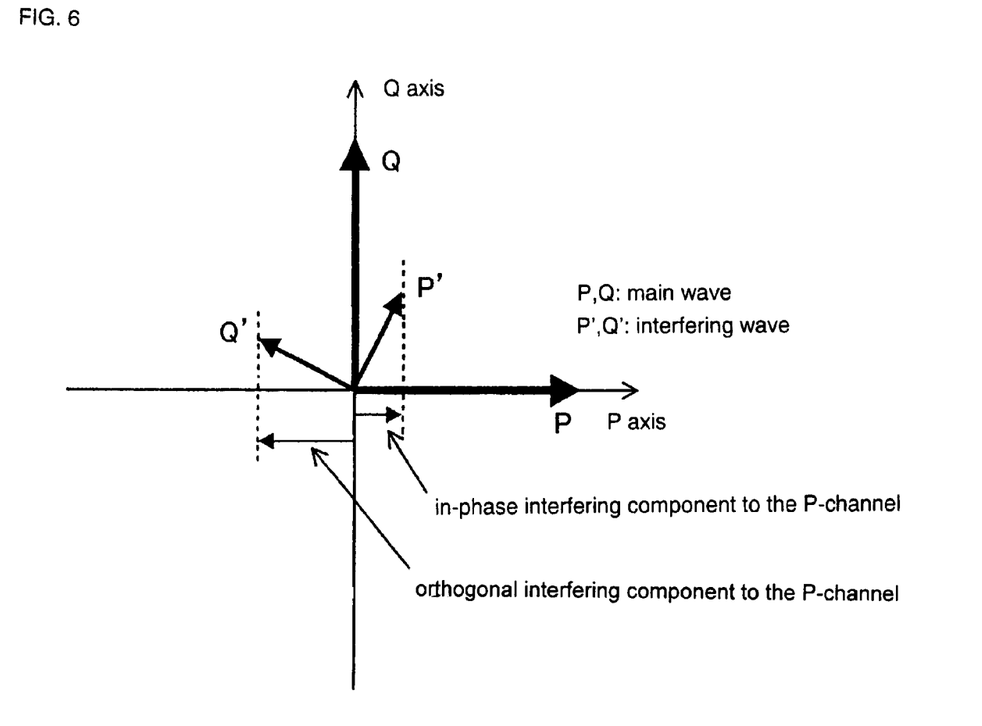
FIG. 6 is a diagram showing a vector relationship between main waves and interfering waves in orthogonal modulation when fading occurs.

The selectivity fading occurs because signals which have passed through a plurality of routes having different route lengths in a transmission path are combined at a reception point. FIG. 6 shows the vector relationship between main waves and interfering waves in the orthogonal modulation. In FIG. 6, the main waves are represented by P, Q, and only these are received when no fading is occurring. When the fading occurs, signals which have passed through different routes from the main waves are added to the main waves. The interfering waves are represented by P', Q'. The interfering components are received in a state rotated from the vectors of the main waves due to the route difference. Consider now interfering components to a main wave on a P-channel. A first one is an interfering component from P'. This is a component of P' in a P-axis direction, and is interference from the same P-channel, so that this is an in-phase interfering component to the P-channel main component. The other one is an interfering component from Q'. This is a component of Q' in the P-axis direction, and is an interfering component from the Q-channel which is an orthogonal component to the P-channel, so that this is an orthogonal interfering component to the P-channel.

These interfering components affect the eye pattern to reduce the opening. As more difficulties are experienced in discriminating the opening of the eye pattern and the position of the zero cross point, clock phase detector 7 delivers correct determination results a reduced number of times, resulting in an instable operation of the clock regeneration PLL.

One function of the equalizer is to compensate for these interfering components. The equalizer has a function of compensating a signal for inter-symbol interference, so that when an equalizer is placed in front of clock phase detector 7, the equalizer equalizes even the inter-symbol interference which is caused by a sampling phase shift in analog/digital converters 3, thus failing to detect the clock phase. Since the orthogonal interfering components are generally interfering components from orthogonal signals which have no correlation to each other in the orthogonal modulation scheme, they are noise which are not correlated to signals of their phases. Therefore, the orthogonal interfering components do not include information required to regenerate a clock, so that no influence is exerted on the clock phase detection even if the orthogonal interfering components are removed from the input of clock phase detector 7. One cause of narrowing the opening of the eye pattern upon occurrence of selectivity fading is noise caused by the orthogonal interfering components, so that if they can be removed, the eye pattern can be opened correspondingly to stably regenerate a clock.

In the clock regeneration circuit of this embodiment, main circuit components additionally required to remove the orthogonal interfering components are two transversal filters 31, 32, which are FIR (Finite Impulse Response) filters, as illustrated in FIG. 4, and tap coefficients essentially generated in equalizer 5 are used as they are, so that the cost need not be much increased in terms to the circuit scale and the like.

Next, a description will be given of a reason for which the resistance of the overall demodulator can be improved to the selectivity fading by improving the clock synchronization resistance against the selectivity fading.

Figure 7:
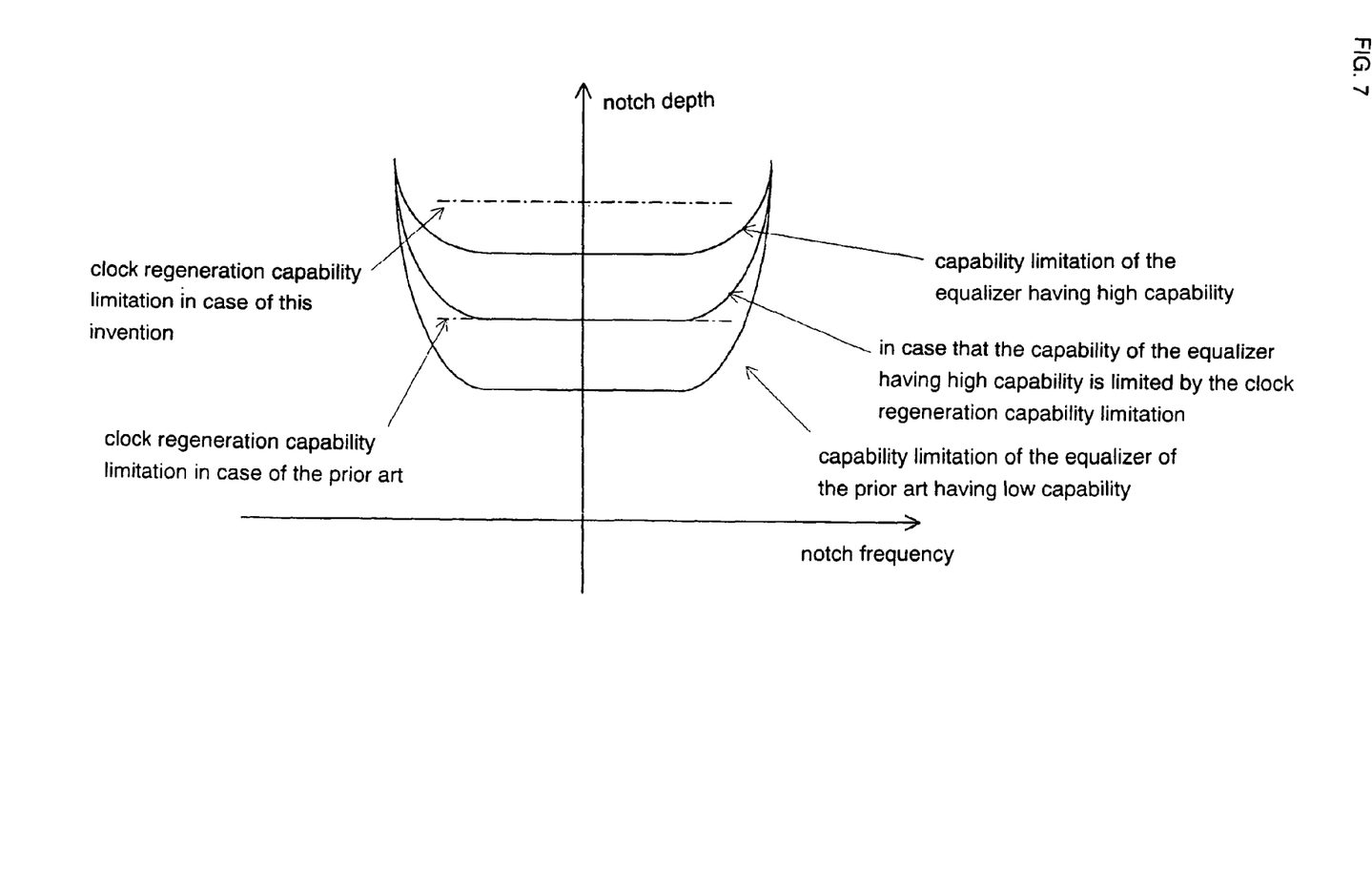
FIG. 7 is a diagram for describing the relationship between limitations of clock regeneration capabilities and limitations of equalizer performance in the present invention and prior art.

FIG. 7 shows signature characteristics and limitations of clock regeneration capabilities to notch depths of conventional equalizers which have high and low equalization capabilities. A regenerated clock falls into out-of-phase when fading occurs at a notch depth which exceeds limitations of clock regeneration capabilities. With a conventional equalizer having low equalization capabilities, the equalizer has capability limitations lower than conventional clock regeneration capabilities, so that the signature characteristic of the demodulator is dominated only by the capability limitations of the equalizer, whereas the clock regeneration capability limitations do not affect the signature characteristic or cause any problem. However, as the equalizer has been improved in capabilities to an extent that its equalization capability limitations exceed the clock regeneration capability limitations, the signature characteristic of the demodulator is restricted by the clock regeneration capability limitations, resulting in a problem of failing to fully exert the performance of the equalizer highly capable of equalization.

In this embodiment, a clock can be regenerated with higher stability when selectivity fading occurs by keeping the opening of the eye pattern as wide as possible in the input of the clock phase detector to maintain the gain of the clock phase detector with use of a clock regeneration PLL circuit for detecting the clock phase after removing orthogonal interfering components therefrom. By increasing the clock regeneration capabilities to or beyond equalization capability limitations of a highly capable equalizer this method enables the highly capable equalizer to fully exert its characteristics.

Second Embodiment

Next, a description will be given of a clock regeneration circuit according to a second embodiment of the present invention.

Figure 8:
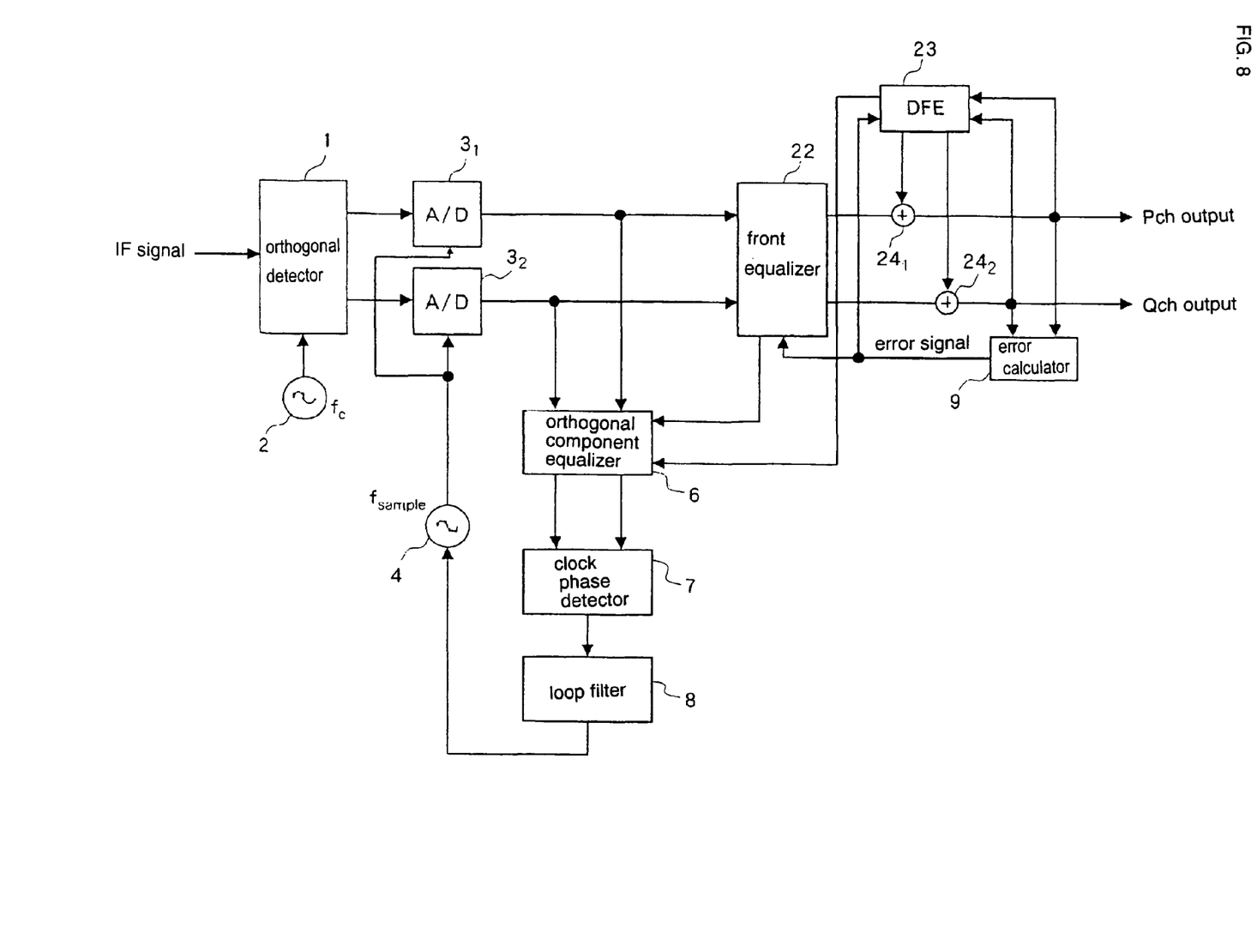
FIG. 8 is a block diagram illustrating the configuration of a clock regeneration circuit according to a second embodiment of the present invention.

As illustrated in FIG. 8, a demodulator according to the second embodiment of the present invention comprises front equalizer 22 instead of equalizer 5, decision feed-back equalizer 23 (DFE), and adders $24_1$, $24_2$, based on the demodulator of the first embodiment illustrated in FIG. 2. Orthogonal component equalizer 6 in this embodiment is the same as that in the first embodiment illustrated in FIG. 2.

While a detailed description is omitted herein in regard to the configuration of decision feedback equalizer 23, orthogonal tap coefficients of front equalizer 22 and decision feedback equalizer 23 also reflect the magnitude of orthogonal interfering components in this embodiment, and by using all or part of them as tap coefficients for orthogonal component equalizer 6, a clock regeneration PLL can be configured to have high resistance against the selective fading.

While the first and second embodiments have been described in a scenario where the present invention is applied to a demodulator conforming to the QAM scheme, the present invention is not so limited, but is effective to any modulator conforming to the orthogonal modulation scheme irrespective of the type. Also, a carrier regeneration scheme of the demodulator may be a synchronous detection scheme or a quasi-synchronous detection scheme. The present invention is also effective to either a baseband sampling scheme which performs up to orthogonal detection in analog circuits or an IF sampling scheme which converts an IF signal into a digital signal and performs orthogonal detection through digital processing.

The invention claimed is:

1. A clock regeneration circuit for a demodulator used in a digital radio communications apparatus employing an orthogonal modulation scheme, comprising:

two analog/digital converters for sampling orthogonally demodulated signals of a first and a second channels orthogonally detected by an orthogonal detector, respectively, using a sampling clock signal applied thereto for conversion into digital values, and delivering the digital values;

an orthogonal interfering component reducing module for reducing only an orthogonal interfering component from interfering components introduced by inter-symbol interference for signals from said two analog/digital converters;

a clock phase detector for detecting the phase of a signal delivered from said orthogonal component reducing module to deliver a signal indicative of a direction of a shift of a sampling position in said two analog/digital converters;

a loop filter for removing high frequency components from the signal delivered from said clock phase detector to deliver as a frequency control signal; and a voltage controlled oscillator for supplying said two analog/digital converters with a clock signal, the frequency of which is controlled by the frequency control signal from said loop filter, as the sampling clock signal, wherein said orthogonal interference component reducing module comprises an orthogonal component equalizer comprising:

a first transversal filter for compensating a signal on a first channel applied from said analog/digital converter for interference caused by an orthogonal component;

a first delay adjustment circuit for giving a delay amount equivalent to a delay amount at a center tap of said first transversal filter to the signal on the first channel applied from said analog/digital converter;

a first adder for adding an output of said first delay adjustment circuit and an output from said first transversal filter to deliver to said clock phase detector as the signal on the first channel;

a second transversal filter for compensating a signal on a second channel applied from said analog/digital converter for interference caused by an orthogonal component;

a second delay adjustment circuit for giving a delay amount equivalent to a delay amount at a center tap of said second transversal filter to the signal on the second channel applied from said analog/digital converter; and a second adder for adding an output from said second delay adjustment circuit and an output from said second transversal filter to deliver to said clock phase detector as the signal on the second channel.

2. The clock regeneration circuit according to claim 1, wherein said first and second transversal filters are applied with and use orthogonal tap coefficients which are used in an equalizer disposed in a demodulator.

3. The clock regeneration circuit according to claim 2, wherein said equalizer comprises a front equalizer and a decision feedback equalizer.

4. A method of improving a demodulation in an apparatus employing an orthogonal modulation scheme, said method comprising:

disposing an orthogonal interfering component reducing module in front of a clock phase detector for detecting a direction of a shift of a sampling position in an analog/digital converter for a signal applied thereto, for reducing only an orthogonal interfering component from interfering components introduced by inter-symbol interference, wherein said orthogonal interfering component reducing module comprises a component in a clock regeneration circuit for a demodulator used in a digital radio communications apparatus, said clock regeneration circuit comprising:

two analog/digital converters for sampling orthogonally demodulated signals of a first and a second channels orthogonally detected by an orthogonal detector, respectively, using a sampling clock signal applied thereto for conversion into digital values, and delivering the digital values;

said orthogonal interfering component reducing module, for said reducing only the orthogonal interfering component from interfering components introduced by inter-symbol interference for signals from said two analog/digital converters;

a clock phase detector for detecting the phase of a signal delivered from said orthogonal component reducing module to deliver a signal indicative of a direction of a shift of a sampling position in said two analog/digital converters;

a loop filter for removing high frequency components from the signal delivered from said clock phase detector to deliver as a frequency control signal; and a voltage controlled oscillator for supplying said two analog/digital converters with a clock signal, the frequency of which is controlled by the frequency control signal from said loop filter, as the sampling clock signal, wherein said orthogonal interfering component reducing module comprises an orthogonal component equalizer comprising:

a first transversal filter for compensating a signal on a first channel applied from said analog/digital converter for interference caused by an orthogonal component;

a first delay adjustment circuit for giving a delay amount equivalent to a delay amount at a center tap of said first transversal filter to the signal on the first channel applied from said analog/digital converter;

a first adder for adding an output of said first delay adjustment circuit and an output from said first transversal filter to deliver to said clock phase detector as the signal on the first channel;

a second transversal filter for compensating a signal on a second channel applied from said analog/digital converter for interference caused by an orthogonal component;

a second delay adjustment circuit for giving a delay amount equivalent to a delay amount at a center tap of said second transversal filter to the signal on the second channel applied from said analog/digital converter; and a second adder for adding an output from said second delay adjustment circuit and an output from said second transversal filter to deliver to said clock phase detector as the signal on the second channel.

5. The method of claim 4, wherein said first and second transversal filters are applied with and use orthogonal tap coefficients which are used in an equalizer disposed in a demodulator.

6. The method of claim 5, wherein said equalizer comprises a front equalizer and a decision feedback equalizer.

* * * * *